Aug. 26, 1958

C. W. KISSINGER 2,849,629

CHATTER ACCELEROMETER

Filed Aug. 16, 1955

ZERO-TO-PEAK ACCELERATION, IN G

PHASE ANGLE, $\beta$, IN DEGREES

INVENTOR
Charles W. Kissinger
BY
Arthur Vinograd
Leonard F. Stoll ATTORNEY
AGENT Aug. 26, 1958 C. W. KISSINGER 2,849,629
CHATTER ACCELEROMETER
Filed Aug. 16, 1955 2 Sheets-Sheet 2

INVENTOR
Charles W. Kissinger
BY
ATTORNEY
AGENT

United States Patent Office 2,849,629
Patented Aug. 26, 1958

2,849,629

CHATTER ACCELEROMETER

Charles W. Kissinger, Hyattsville, Md., assignor to the United States of America as represented by the Secretary of Commerce Application August 16, 1955, Serial No. 528,851

5 Claims. (Cl. 310—8.4)

This invention relates to accelerometers and more particularly to an improved chatter accelerometer with means for clamping the vibrating mass.

It is well known that a loose mass resting on a vertical oscillating surface will bounce or chatter when the peak acceleration of the surface slightly exceeds the acceleration of gravity. The present invention utilizes this phenomenon in a self-calibrating accelerometer which is provided with means for clamping the loose mass after calibration so that the accelerometer is not limited to a range slightly above the referred to 1 g value.

One object of this invention is to provide an improved self-calibrating accelerometer.

Another object of this invention is to provide an improved accelerometer having a loose mass therein which chatters at acceleration values slightly above 1 g.

A further object of this invention is to provide an improved accelerometer having a loose mass and means for clamping said mass when so desired.

A still further object of this invention is to provide an accelerometer which may be self-calibrating by means of the chatter method but which is not limited to use at accelerations near 1 g.

Other uses and advantages of the invention will become apparent upon reference to the specification and drawings.

Figure 1:
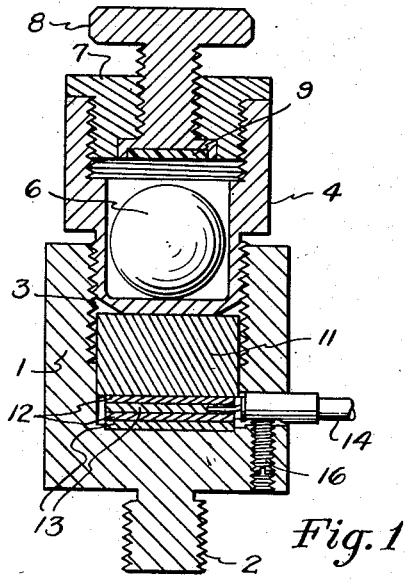
Fig. 1 is a vertical cross-sectional view of the accelerometer of the present invention.

In Fig. 1 is shown an accelerometer having a base 1 with a smaller lower threaded portion 2 adapted to be screwed into a suitable receptacle in a shaker table. The base 1 is internally threaded at 3 to receive a threaded steel cup 4 in which rests a bronze ball 6. Threadably received within cup 4 is a cap 7 through the center of which a clamping screw 8 is adjustably mounted. The lower portion of clamping screw 8 carries a plastic disc 9 the purpose of which is to firmly hold bronze ball 6 against the bottom of steel cup 4 when screw 8 is rotated to clamping position.

Within base 1 and below cup 4 is a brass loading mass 11 which rests on two barium-titanate discs 12 separated from each other and from base 1 by spaced brass supporting plates 13. An electrical signal is derived from discs 12 by way of a cable 14 securely held in place by a set screw 16. The variation in acceleration of the masses which effectively load discs 12 (i. e. loading mass 11, cup 4, cap 7, screw 8, and ball 6) as the accelerometer is oscillated results in a variation of the force which they exert on the piezoelectric barium-titanate discs 12. This variation in force on discs 12 brings about in a well-known manner a variation in the electrical properties of discs 12 from which an output signal may be derived through cable 14.

Figure 2:
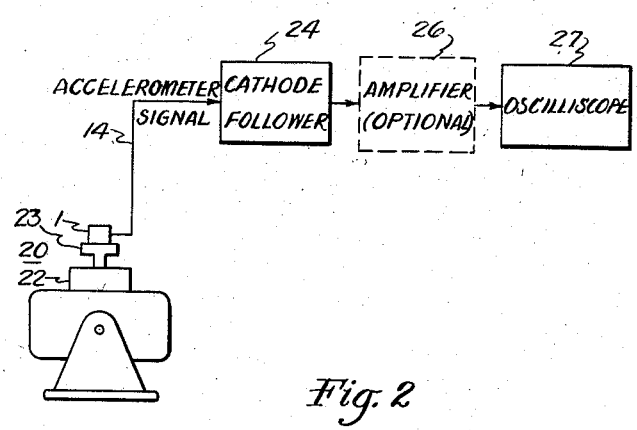
Fig. 2 shows a block diagram of typical circuitry used in conjunction with the accelerometer of Fig. 1.

Fig. 2 showing in block-diagram form the apparatus used to make measurements of chatter phase and chatter amplitude includes a conventional electrodynamic shaker 20, having a built-in velocity meter 22. Chatter accelerometer 1 is attached to the shaker table 23 by means of the referred-to connecting stud 2. The electrical output signal from accelerometer 1 passes through cable 14 to a conventional cathode-follower stage 24, additional amplifiers 26 if desired, and finally to oscilloscope 27.

Figure 3:
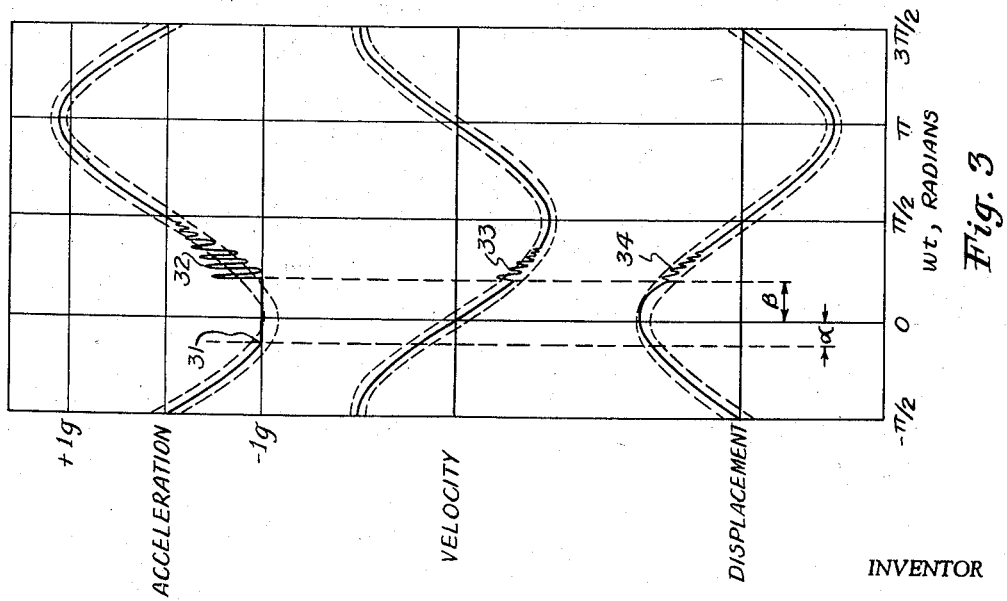
Fig. 3 is a plot of the acceleration, velocity, and displacement of both the shaker table and loose mass as functions of phase angle.

Fig. 3 shows a plot of the accelerations, velocities, and displacements of both a shaker table executing vertical simple harmonic motion and a loose mass resting on the table, all as functions of phase angle $\omega t$. The wide bands represented by the parallel dotted lines represent the motion of the shaker table and the narrow solid lines represent the motion of a loose mass. At point 31, as the acceleration of the table exceeds $-1$ g, the loose mass leaves the table and begins to fall freely with a constant acceleration equal to 1 g. At some later time the loose mass again makes contact with the table and bounces, producing the acceleration oscillations 32 which gradually die out with the decay in bounce amplitude of the loose mass. Similar oscillations appear in the velocity curve at 33 corresponding to the period during which the mass bounces or chatters. Likewise the curve showing the displacement of the loose mass exhibits oscillatory characteristics during the chatter period as shown at 34. The angle between maximum negative acceleration of the table and the point at which the loose mass begins free fall is labeled $\alpha$, while the angle $\beta$ is the angle between maximum negative acceleration of the table and the point in the cycle at which the loose mass, after having separated, again contacts the moving object on which it was resting, i. e., the shaker table.

As the accelerometer accelerates in the negative, i. e. downward, direction the ball 6 of Fig. 1 remains at rest on the bottom of cup 4. However, since the ball is free it leaves this position of rest when the negative acceleration of the accelerometer exceeds 1 g. While it is separated from cup 4, ball 6 exerts no force on the discs 12 and hence does not contribute to the output signal from the discs during this period. At some point beyond the peak of negative accelerometer acceleration the ball "catches up" with the motion of the accelerometer and again makes contact with the bottom of cup 4. Here the ball 6 bounces or chatters producing the visible oscillatory effects on the output signal as seen on an oscilloscope. The angles $\alpha$ and $\beta$ are related to the phase angle or duration in time with respect to a complete cycle that the ball is separated from the bottom of cup 4. Since the phase angles are dependent upon the magnitude of acceleration they can be utilized to calibrate the accelerometer against the reading given by the accelerometer at the same value of acceleration but with ball 6 securely clamped in place by means of screw 8.

Figure 4:
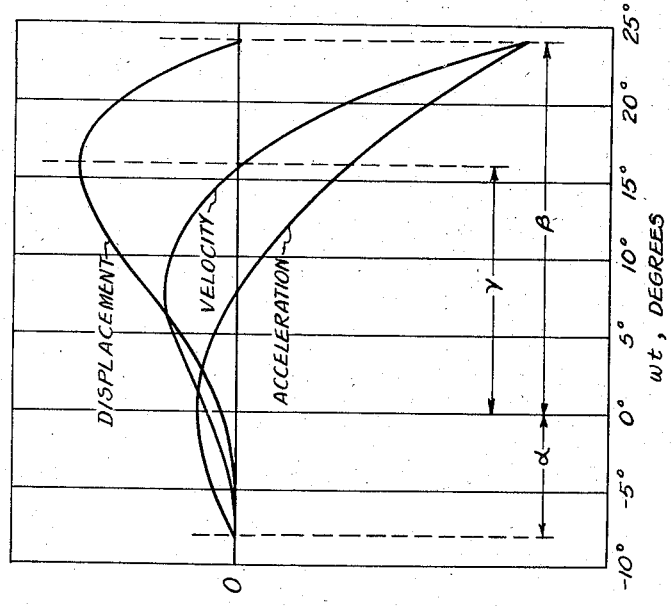
Fig. 4 is a theoretical plot of the acceleration, velocity, and displacement of the loose mass relative to the shaker table as a function of phase angle.

Fig. 4 shows theoretical graphs of displacement, velocity and acceleration as functions of phase angle $\omega t$ for a loose mass relative to a shaker table. The angle $\gamma$ is the phase angle between the point of maximum negative table acceleration and the point at which maximum displacement between the mass and table occurs.

Figure 5:
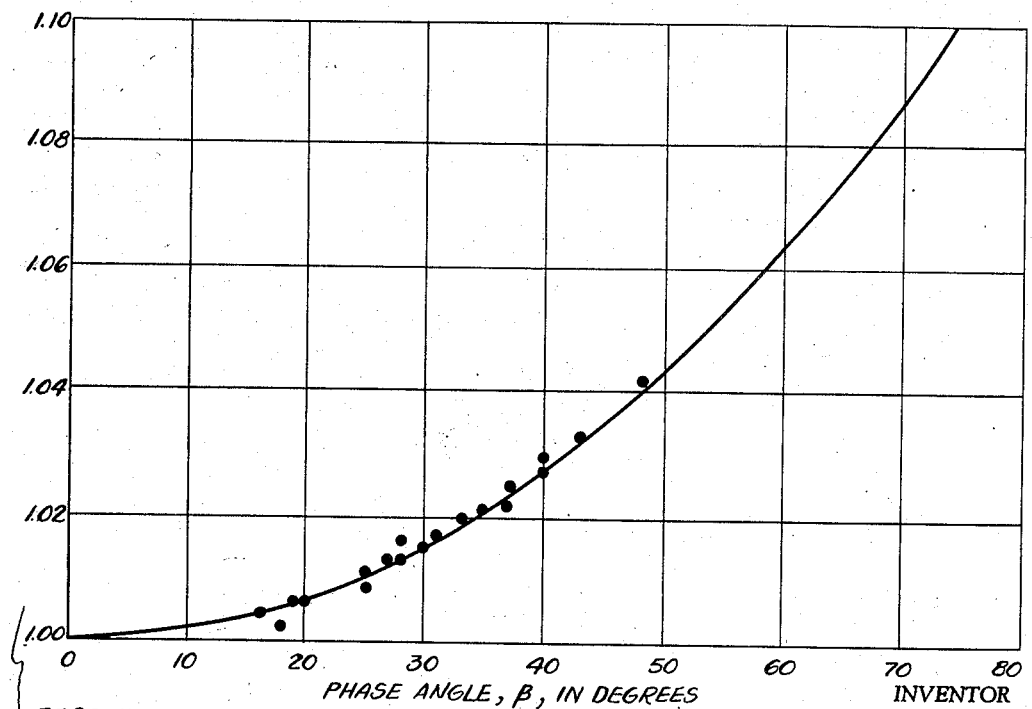
Fig. 5 shows a plot of zero-to-peak acceleration of the shaker table as a function of the phase angle between peak negative acceleration of the shaker table and the return contact point of the loose mass with the table.

Fig. 5 shows a curve of the zero-to-peak acceleration of the shaker table plotted as a function of the phase angle $\beta$ which is the angle between the peak negative acceleration of the table and the point of return contact between the table and the loose mass. The solid line represents the theoretical curve derived from the mathematical analysis given below. The individual dots represent experimental points in which the phase angle is read from the oscilloscope in the arrangement shown in Fig. 2 and the relative acceleration value is obtained from the velocity meter 22 built into the shaker. Absolute value of acceleration was determined independently by an optical calibration. It can be noted that the experimental points are in close agreement with the results obtained theoretically. Because of such indicated correlation it is apparent that the chatter phase angle as measured on an oscilloscope provides an accurate calibration of the accelerometer for various acceleration ranges.

In operation the accelerometer is excited at accelerations slightly greater than 1 g. The accelerometer output as indicated on the oscilloscope will be in the form of a sine wave the amplitude of which represents the magnitude of acceleration. Superimposed on this wave there will be chatter effect previously described. While any of the described angles $\alpha$, $\beta$, $\gamma$ can theoretically be utilized it has been found that the angle $\beta$ is the one most conveniently read from an oscilloscope. From the reading of this angle the acceleration magnitude can be very accurately determined and, without changing acceleration level, the loose mass may be clamped and the magnitude of the accelerometer oscillatory output wave observed by suitable means, such as an appropriate voltmeter. Thus the chatter phase angle provides a means for calibrating the accelerometer output with the loose mass clamped, at acceleration values slightly above 1 g. After the accelerometer has in this way been self-calibrated, it may then be used as a reference standard, with the loose mass remaining clamped, over a much larger range of acceleration values.

The angles $\alpha$, $\beta$, $\gamma$, may be determined mathematically as follows.

It is assumed that the object, such as a shaker table upon which the loose mass is resting executes simple harmonic motion in a vertical direction, with a zero-to-peak acceleration slightly greater than $\pm 1$ g. The motions of the shaker table and the loose mass are considered in detail over one cycle. From the equations of motion, the points in the cycle at which separation and return contact occur are determined.

In Fig. 3 all quantities are considered relative to a fixed frame of reference. The point $\omega t=0$ is arbitrarily chosen as the time at which the shaker reaches its maximum displacement in the upward direction, since this point is convenient for use as a reference in the experimental observation of the chatter. Starting at $\omega t=\pi/2$, when the shaker is at the midpoint of its displacement and travelling upward, and following the progress of the motion along the time axis, the loose mass and shaker table remain in contact as the table moves upward, until the negative sinusoidal acceleration equals the acceleration of gravity. At this point the loose mass separates from the shaker table, since no tension can be exerted between the two, as would be required to give the loose mass a negative acceleration greater than $-1$ g. While the shaker table proceeds in its simple harmonic motion, the loose mass is in free fall. Therefore, for this portion of the cycle, the acceleration of the loose mass remains constant at $-1$ g, the downward velocity increases linearly, and the plot of displacement vs. time is a parabola. The point at which the loose mass makes contact in returning to the shaker table is shown by the second intersection of the parabola and the sine wave in the plot displacement. This point will be referred to as the phase angle of chatter, or merely chatter phase. Since the two velocities are not equal at this point the loose mass rebounds, and the subsequent collisions give rise to the "chatter" which gives the method its name.

The behavior just described lends itself readily to analytical determination of the phase, on the sine wave, at which the return contact occurs. This is done by writing the equations for the motion of the shaker and of the loose mass (while in free fall) and solving these equations simultaneously.

Let the shaker acceleration be given by $$a_s = -kg \cos \omega t \qquad (1)$$

where:

$a_s$ = shaker acceleration
$g$ = acceleration of gravity
$k$ = ratio of zero-to-peak sinusoidal acceleration to the acceleration of gravity
$\omega$ = angular frequency
$t$ = time Then, by integration, and with reference axes as shown in Fig. 3.

$$v_s = -\frac{kg}{\omega} \sin \omega t \qquad (2)$$

$$d_s = \frac{kg}{\omega^2} \cos \omega t \qquad (3)$$

where:

$v_s$ = shaker velocity
$d_s$ = shaker displacement.

For the loose mass in free fall, the acceleration, $a_m$, velocity, $v_m$, and displacement, $d_m$, are given by:

$$a_m = -g \qquad (4)$$

$$v_m = -gt + C_1 \qquad (5)$$

$$d_m = -\tfrac{1}{2}gt^2 + C_1 t + C_2 \qquad (6)$$

The phase angle, $\omega t = \alpha$, at which separation occurs is found from Equation 1 by setting $a_s = -g$:

$$k \cos \omega t = 1$$

$$t = \arccos \frac{1}{k} = \alpha$$

With reference axes as chosen, the angle $\alpha$ is always a negative angle. Also, its value depends only on $k$, the ratio of the peak acceleration divided by 1 g. and is therefore independent of frequency.

Before Equations 3 and 6 can be solved simultaneously for the point of return contact, it is necessary to evaluate the constants $C_1$ and $C_2$. This may be done by equating the velocities, and also the displacements, of the shaker and loose mass at the point of separation, i. e., at $\omega t = \alpha$.

When this is done, Equation 6 becomes:

$$d_m = -\tfrac{1}{2}gt^2 - \frac{gt}{\omega}(k \sin \alpha - \alpha) + \frac{g}{\omega^2}(1\tfrac{1}{2}\alpha^2 + \alpha k \sin \alpha)$$
$$(7)$$

Equating the right-hand sides of Equations 3 and 7 yields:

$$k \cos \omega t = -\tfrac{1}{2}(\omega t)^2 - \omega t(k \sin \alpha - \alpha) + (1\tfrac{1}{2}\alpha^2 + \alpha k \sin \alpha)$$
$$(8)$$

The expressions for the accelerations, velocities, and displacements of the loose mass and the shaker table, relative to a fixed frame of reference, were given by Equations 1 through 6. The acceleration, velocity or displacement of the loose mass relative to the shaker table may be obtained at any particular value of $\omega t$ by subtracting the equation for the shaker table from the corresponding equation for the loose mass.

For acceleration, subtracting Eq. 1 from Eq. 4 yields:

$$a_m - a_s = -g + kg \cos \omega t$$

$$= g(k \cos \omega t - 1) \qquad (10)$$

Equation 10 shows that the relative acceleration at any particular phase angle, $\omega t$, is dependent only on $k$ and not on frequency.

For velocity, subtracting Eq. 2 from Eq. 5 gives:

$$v_m - v_s = (-gt + C_1) + \left(\frac{kg}{\omega} \sin \omega t\right)$$

where $$C_1 = -\frac{g}{\omega}(k \sin \alpha - \alpha)$$

obtained as indicated above.

Making this substitution, $$v_m - v_s = -\frac{g}{\omega}\left[(\omega t - k \sin \omega t) - (\alpha - k \sin \alpha)\right] \quad (11)$$

The factor $$\frac{1}{\omega}$$

in Eq. 11 shows that the relative velocity at any particular values of $\omega t$ and $k$ is inversely proportional to frequency.

An approximate relation between the phase angle $\alpha$ at which separation occurs, and the phase angle $\gamma$ at which the relative velocity is again zero, i. e. where the relative displacement is a maximum, may be derived by setting Eq. 11 equal to zero and substituting (by definition) $\omega t = \gamma$, and $$k = \frac{1}{\cos \alpha}$$

This yields the expression:

$$(\gamma - \alpha)\cos \alpha - \sin \gamma + \sin \alpha = 0$$

Substituting the appropriate series expansions for the trigonometric functions, and discarding all terms above 3rd order, this becomes $$2\alpha^3 - 3\gamma\alpha^2 + \gamma^3 = 0$$

or $$(2\alpha + \gamma)(\alpha - \gamma)^2 = 0 \quad (12)$$

The roots are $\gamma = \alpha$, the point of initial separation, and $\gamma = -2\alpha$, the point of maximum separation.

Relative displacement at any time $\omega t$ is given by subtracting Eq. 3 from Eq. 7:

$$d_m - d_s = \frac{g}{\omega^2}\left[-\frac{1}{2}(\omega t)^2 - \omega t(k \sin \alpha - \alpha) + \left(1 - \frac{1}{2}\alpha^2 + \alpha k \sin \alpha - k \cos \omega t\right)\right] \quad (13)$$

The factor $$\frac{1}{\omega^2}$$

in Eq. 13 shows that relative displacement for a given $\omega t$ and $k$ is inversely proportional to the square of the frequency.

In a manner similar to the method used for velocity, above, the point of return contact, at phase angle $\beta$, may be found by setting Equation 13 equal to zero and substituting the values $\omega t = \beta$ and $$k = \frac{1}{\cos \alpha}$$

$$\cos \alpha - \frac{1}{2} \cos \alpha(\alpha - \beta)^2 + (\alpha - \beta)\sin \alpha - \cos \beta = 0$$

Upon substituting the series expansion for the trigonometric functions and discarding all terms above the 4th order, this becomes $$3\alpha^4 - 8\alpha^3\beta + 6\alpha^2\beta^2 - \beta^4 = 0$$

or $$(3\alpha + \beta)(\alpha - \beta)^3 = 0 \quad (14)$$

Equation 14 has as roots $\beta = \alpha$, which is the point of separation, and $\beta = -3\alpha$, which is the point of return contact.

Relative acceleration, velocity, and displacement, as obtained from Equations 10, 11, and 13 are plotted vs. $\omega t$ in Fig. 4, for $k = 1.01$. The general shape of the curves in Fig. 4 remain the same with variations of $k$, although the values of the ordinates, as well as the phase angles $\alpha$, $\beta$, and $\gamma$, change.

The present invention provides an accelerometer in which the loose mass bounces or chatters when the peak acceleration of a vertical sinusoidal motion exceeds the acceleration due to gravity. The accelerometer has many uses, for example, it may be used in setting the acceleration level of vibration generators used in the calibration of vibration pickups. Using the accelerometer in conjunction with the theoretical angles $\alpha$, $\beta$, and $\gamma$ as derived acceleration levels from about 1.01 g to 1.04 g may be set with an accuracy of approximately ± 0.5% at frequencies up to 60 C. P. S., and with somewhat decreased accuracy at higher frequencies.

An outstanding feature of the accelerometer of the present invention is that a clamping screw is provided by means of which the chatter of the loose mass may be prevented when desired. This allows the accelerometer to be used as a self calibrating secondary standard for levels of acceleration other than around 1 g at frequencies up to about 1200 C. P. S.

Obviously other apparatus can be used or the loading mass omitted and it will be apparent that the embodiment shown is only exemplary and that various modifications can be made in construction and arrangement within the scope of invention as defined in the appended claims.

What is claim is:

1. An accelerometer comprising piezoelectric means, means for deriving an output signal from said piezoelectric means, a loading mass on said piezoelectric means, a loose mass resting on said loading mass, positionable clamping means normally spaced from said loading mass to permit unrestrained motion of said loose mass and selectively operable means for positioning said clamping means relative to said loading mass for fixedly securing said loose mass to said loading mass.

2. A chatter accelerometer comprising a base member having a reentrant portion on one end, physical force responsive signal producing means secured to said base member in said reentrant portion, hollow means adjustably secured to said reentrant portion for applying a variable loading force to said signal producing means, and a chatter mass freely confined in said hollow means, said hollow means including means for selectively fixedly securing said chatter mass to said hollow means.

3. A chatter accelerometer comprising a base member having a reentrant portion on one end, physical force responsive signal producing means in said reentrant portion, cup means adjustably secured to said reentrant portion for holding said signal producing means in said reentrant portion and applying a variable loading force to said signal producing means, a chatter mass freely resting in said cup means, a cap for said cup means and means for selectively fixedly securing said chatter mass to said cup means.

4. An accelerometer as defined in claim 3 in which said signal producing means comprises piezoelectric means.

5. An accelerometer as defined in claim 4 in which said selectively fixedly securing means comprises adjustable screw means passing through said cap for clamping said chatter mass to the bottom of said cup means.

References Cited in the file of this patent

UNITED STATES PATENTS

| | | |
|---|---|---|
| 2,411,401 | Welch | Nov. 19, 1946 |
| 2,514,297 | Smith et al. | July 4, 1950 |
| 2,682,003 | Stubner | June 22, 1954 |
| 2,714,672 | Wright et al. | Aug. 2, 1955 |

UNITED STATES PATENT OFFICE
Certificate of Correction

August 26, 1958

Patent No. 2,849,629

Charles W. Kissinger

It is hereby certified that error appears in the printed specification of the above numbered patent requiring correction and that the said Letters Patent should read as corrected below.

Column 3, line 54, for "$\omega t = \pi/2$" read —$\omega t = -\pi/2$—; column 4, line 53, for that portion of Equation 7 reading "$(1\tfrac{1}{2}\alpha^2 +$" read —$(1 - \tfrac{1}{2}\alpha^2 + $—; line 58, for that portion of Equation 8 reading "$+ (1\tfrac{1}{2}\alpha^2 +$" read —$+ (1 - \tfrac{1}{2}\alpha^2 + $—; column 5, line 36, right-hand portion of Equation 12, for "$(\alpha - \gamma^2 = 0$" read —$(\alpha - \gamma)^2 = 0$—.

Signed and sealed this 4th day of November 1958.

[SEAL]

Attest:
KARL H. AXLINE,
*Attesting Officer.*

ROBERT C. WATSON,
*Commissioner of Patents.*